United States Patent [19]

Overby

[11] 4,029,408

[45] June 14, 1977

[54] MAP READING APPARATUS

[76] Inventor: David R. Overby, 205 Brandon Court, Raleigh, N.C. 27606

[22] Filed: Sept. 29, 1975

[21] Appl. No.: 617,679

[52] U.S. Cl. .............................. 353/110; 353/78
[51] Int. Cl.² .................. G03B 21/22; G03B 23/10
[58] Field of Search .............. 353/11, 12, 110, 77, 353/74, 78, 98, 99; 40/106.1, 70 A, 63 A, 64 A, 86 A

[56] References Cited

UNITED STATES PATENTS

| | | | |
|---|---|---|---|
| 1,564,722 | 12/1925 | Tavern et al. | 40/63 A |
| 2,548,488 | 4/1951 | Mella | 353/12 |
| 2,570,652 | 10/1951 | Dilks | 353/110 |
| 2,916,964 | 12/1959 | Paulsohn | 353/110 |
| 3,257,899 | 6/1966 | Hoyt | 353/11 |
| 3,376,782 | 4/1968 | Whitley et al. | 40/70 A |
| 3,826,579 | 7/1974 | Schurgim | 353/12 |
| 3,865,477 | 2/1975 | Gast | 353/11 |
| 3,897,144 | 7/1975 | Hicks | 353/11 |

FOREIGN PATENTS OR APPLICATIONS

| | | | |
|---|---|---|---|
| 1,229,242 | 3/1960 | France | 40/106.1 |
| 345,191 | 12/1921 | Germany | 353/108 |
| 767,624 | 2/1957 | United Kingdom | 353/110 |

*Primary Examiner*—Harry N. Haroian
*Attorney, Agent, or Firm*—Mills & Coats

[57] ABSTRACT

The present invention relates to a map reading device or apparatus adapted to receive a film having a series of frames of map indicia thereon, each map indicia frame representing a certain geographical area such as a State, a portion of a State, a City, a portion of a City, or County, etc. Light is projected through any one of a series of certain desired map indicia frames and a map image is thusly formed. The formed map image is directed through a magnifying lens that magnifies or enlarges the map image and projects the same on a forwardly spaced screen within the map reading apparatus where the map can easily and conveniently be read and studied even while operating a motor vehicle.

3 Claims, 7 Drawing Figures

MAP READING APPARATUS

The present invention relates to visual aids, and more particularly to a visual aid apparatus and film material therefor for enlarging and projecting selected map indicia on the film onto a screen forming a part of the apparatus.

BACKGROUND OF THE INVENTION

In highway traveling, most motorists today use conventional multi-fold road maps such as supplied by gasoline service stations. It is well appreciated that such maps are often very awkward and inconvenient to use as they are difficult to fold and unfold, and in many instances difficult to read and comprehend completely, usually requiring the motorist to stop the vehicle and study the map while stopped. It is quite common for certain geographical areas to be difficult to find on such maps and a substantial amount of time is sometimes used in just trying to properly orient a map with respect to a particular location the motorist finds himself him and in attempting to find certain less conspicuous geographical location. Moreover, when unfolded, such road maps assume substantial space in the vehicle and are not easily handled and manipulated within the confines of the vehicle. Also, such maps may show only a broad portion of the geographical area desired, i.e., main State and Interstate routes. Often particularly Cities and Towns are omitted, not to mention certain County and secondary State Roads. Thus, with the use of the conventional service station maps, the motorist does not have the opportunity to select maps particularly fitted to his needs as they relate to a certain travel plan.

SUMMARY OF THE INVENTION

The present invention presents a map reading apparatus adapted to receive a film material having certain geographical areas mapped and framed thereon, with certain frames including particular geographical areas such as States, portions of States, Cities, portions of Cities, Counties and portions thereof, etc. The film material of the present invention is of importance because a well planned mapping scheme can be incorporated therein such that when in use the map reading device or apparatus of the present invention can be used by a motorist as he moves from one geographical location to another and wherein by selecting certain portions of the film material, the motorist cannot only appraise himself of main routes, State roads, and thoroughfares, but also can focus on the relatively small geographical areas such as Counties, Cities and portions thereof by selectively positioning the film material within the map reading apparatus.

The film material of the present invention, as illustrated in the preferred embodiment of the present disclosure, is in the form of a rotating disc with microfilm frames readily spaced about an outer circumferential portion thereof, each frame including a particular geographical area mapped thereon and consequently, each frame although relatively small includes map indicia shown thereon in scale proportion. The map reading apparatus of the present invention is adapted to receive the film material with the map indicia formed thereon and is further adapted to move the film material within the apparatus such that certain frames of map indicia will be disposed within an optical path of light such that the image found within that respective chosen frame and is projected through the apparatus, and directed through a magnifying lens where the particular map image of the chosen frame is substantially enlarged and projected on a screen where the image is captured for easy and convenient viewing. The map reading apparatus of the present invention can be of a small portable construction carried in the vehicle or attached to the sun visor, or even mounted within or on the dash. The film material provided therefor can cover relatively large geographical areas such as the entire United States with particular portions of the geographical area placed on frames in an orderly fashion such that the user may gain access to the particular geographical areas easily and conveniently. In the preferred embodiment shown herein, the film material is in the form of a circular disc in which certain geographical areas are formed on that respective disc. It is contemplated that the map reading apparatus of the present invention could be provided with a compilation or series of discs with each disc representing a certain geographical area in varying scope, i.e., certain main State and Interstate roads would be shown on certain frames while relatively small geographical areas such as Cities and Counties and even portions thereof could be provided for on other frames within the same disc. Consequently, in traveling the motorist would while traveling in a certain geographical area be able to use one disc for a substantial time and would be able to basically review and comprehend the main routes as well as small or geographical areas such as Counties and Cities.

It is, therefore, an object of the present invention to provide a map reading apparatus of the type adapted to be provided with film material including geographical areas mapped thereon wherein the film material may be utilized with the map reading apparatus to appraise the user thereof of roads and streets and general routes within the particular geographical area being traveled or being viewed.

Still a further object of the present invention is to provide a map reading apparatus that obviates the need and use of the conventional multi-fold road maps, and which is easy and convenient to use and has the capability to clearly project a certain geographical mapped area on a screen that may be viewed by the user.

Still a further object of the present invention is to provide a map reading apparatus and film material therefor with the film material including mapped indicia of certain geographical areas formed thereon, and wherein the map indicia is relatively small and adapted to be received by the map reading apparatus such that the small map indicia on the film can be projected and enlarged onto a screen for viewing by the user.

Another object of the present invention is to provide an apparatus and film material therefor wherein the film material includes a series of map indicia formed on certain frames constituting the film material, and wherein the map reading apparatus is provided with a drive for driving the film material such that certain map indicia frames may be properly aligned with an optical light passing therethrough so as to project the map image of that particular frame through a magnifying lens and onto a screen, and wherein the user can drive the film material through the map reading apparatus such that particular map indicia frames align with the optical path and that geographical area represented thereby can be conveniently and easily viewed.

Still a further object of the present invention is to provide a map reading apparatus of the type described above that is adapted to be used by a motorist while traveling, and is safe and convenient to use, and which may be installed within the dash compartment of the vehicle, or mounted on the sun visor or other appropriate locations within the vehicle, or even maintained on the seat adjacent the driver.

Other objects and advantages of the present invention will become apparent from a study of the following description and the accompanying drawings which are merely illustrative of the present invention.

Figure 1:
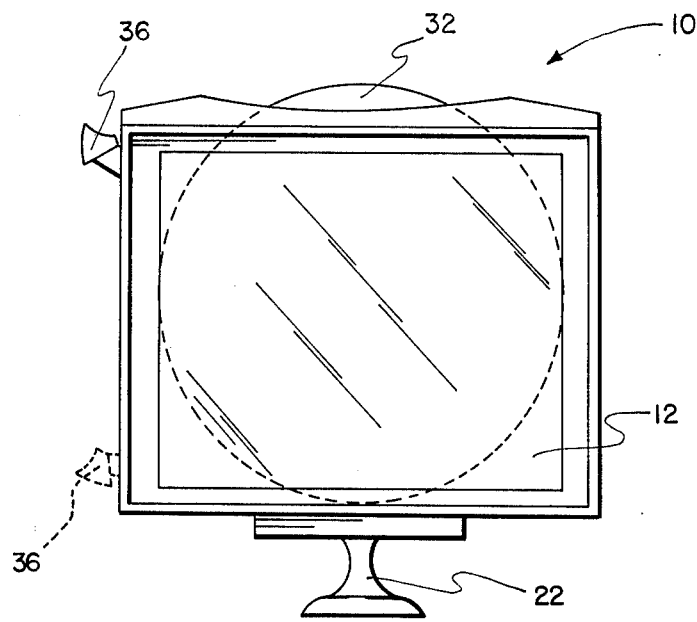
FIG. 1 is a front elevational view of the map reading and projection apparatus of the present invention.

With further reference to the drawings, particularly FIGS. 1 through 4, the map reading apparatus and projection device of the present invention is shown therein and is indicated generally by the numeral 10. Viewing the map projection apparatus 10 in greater detail, it is seen that the same comprises a generally rectangular housing structure including a recess screen 12, a pair of side walls 14, a top 16, a bottom 18, and a back 20. The various top, side, bottom, and back portions just referred to are constructed together of plastic, metal or any other suitable material to form the housing structure of the map projection apparatus of the present invention. With respect to the screen 12, it is noted that the same may be of a poly screen or T.V. screen type and may be appropriately tinted in order that an image projected thereon will be captured and held thereby.

Figure 2:
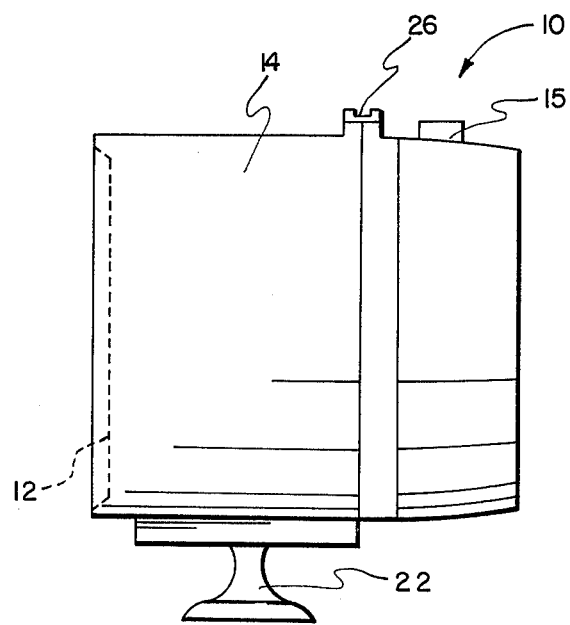
FIG. 2 is a side elevational view of the map reading and projection apparatus shown in FIG. 1.
Figure 3:
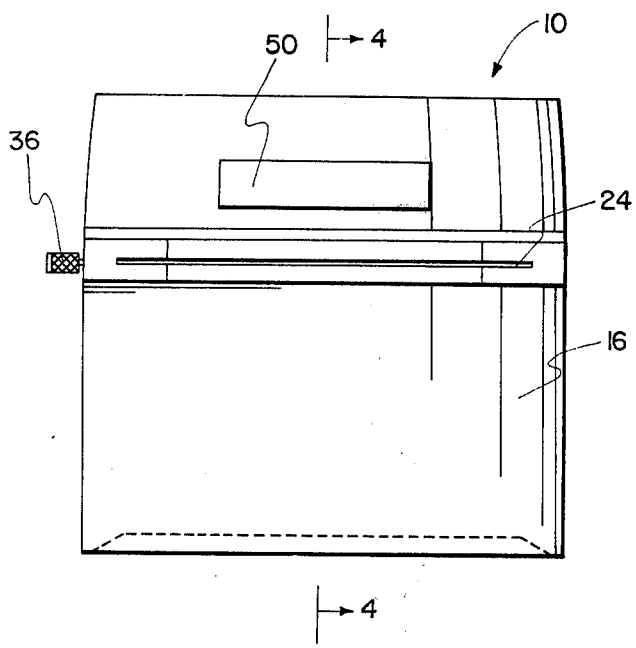
FIG. 3 is a top plan view of the same map reading and projection apparatus.

Fixed to the bottomm 18 of the housing is a foot support structure 22, as illustrated in FIGS. 1 and 2, of one preferred embodiment which allows the map projection apparatus to be supported above a generally planar surface. It will be understood by those skilled in the art that the map projection apparatus 10 of the present invention could also be constructed so as to fit into the dash compartment of a motor vehicle, or could be provided with other conventional attachments that would allow the same to be attached to various objects and surfaces such as a sun visor.

Figure 6:
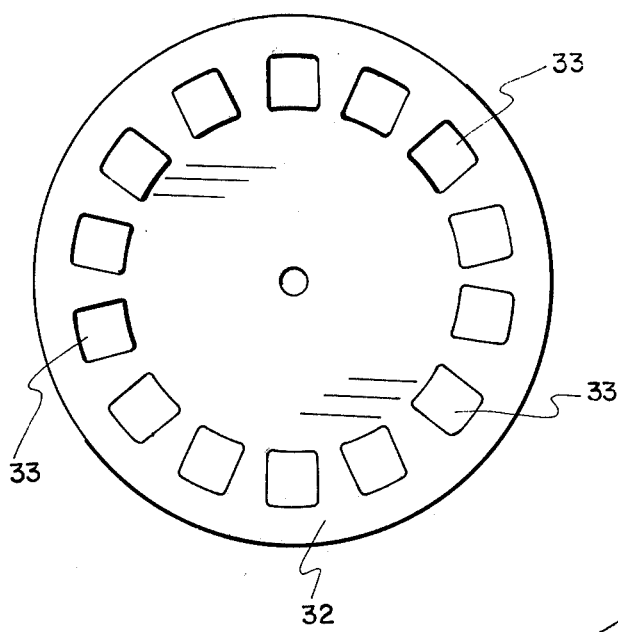
FIG. 6 is a plane view of a circular disc type of film material used by the map reading and projection apparatus of the preferred embodiment.

The map projection apparatus includes film holding means, indicated generally by the numeral 24, disposed therein and as in the case of the preferred embodiment shown in the drawings, the film holding means is disposed rearwardly of the screen 12 and extends substantially across the entire cross sectional area of the housing. Referring to the film holding means 24, it is seen that in the case shown in the drawings the same comprises an open top slit opening 26 that is adapted to receive a film material in the form of a film disc 32, shown specifically in FIGS. 6 and 7. Forming the space referred to as the slit opening 26, is a pair of transverse plates 28 and 30 that are spaced apart a distance sufficient enough to receive the film disc 32 just referred to.

Although not particularly illustrated in the drawings, the film holding means 24 is provided with a rotary drive mechanism for driving the film disc 32 about a central axis. Such drive mechanisms are well appreciated in the art as they are commonly used with the viewmaster type of viewing device, and as shown in the drawings, is actuated by a finger lever 36 disposed along either side of the housing and adapted upon actuation to rotate the film disc within the film holding means 24, or the two plates 28 and 30 extending transversely across the housing of said map reading apparatus 10. Also, it might be mentioned that it would be desirable to provide an additional rotary drive mechanism within the film holding means for driving the film disc 32 in a rotary direction counter to the direction of the first rotary drive mechanism. In this case, it would be desirable to provide an additional finger lever on the side of the housing opposite said first finger lever 36. This would enable the user of the map reading apparatus 10 to move the film disc both clockwise and counterclockwise and would accordingly enable the user to reach a particular map indicia frame quicker.

As has already been indicated, the particular map projection apparatus of the preferred embodiment shown is adapted to receive a rotary film disc 32 in which the same includes a series of circumferential spaced map indicia frames 33 formed about an outer circumferential portion thereof. Therefore, the film holding means 24 is provided with an optical path opening means 38 that is spaced from the central area of said plates 28 and 30 that when the film disc 32 is being held within the film holding means 24, that the respective map indicia frames 33 will align therewith as the disc is rotatively driven clockwise or counterclockwise between the two plates 28 and 30. Disposed behind the rearmost plate 28 is a light source 40 including a shield 42 that is placed generally behind the optical path opening means 28 formed within the film holding means 24. The light source 42 or lightbulb is activated and powered by a pair of dry cell batteries 48 (or other appropriate electrical current sources of a car) electrically connected thereto (not shown) in appropriate and suitable fashion. Although the details of the electrical network is not shown herein because such as well known in the art, it will be noted that a depressable switch 50 extending upwardly through the top 16 of the housing is provided and spring biased to an upwardly normally open position. By depressing the switch 50, the normally opened switch (not shown) is closed and current from the batteries 48 is allowed to flow to the light source or bulb 40. Illumination from the light source is channeled through the optical path opening means 38 and through the particular map indicia frame aligned therewith to create a map image.

Figure 4:
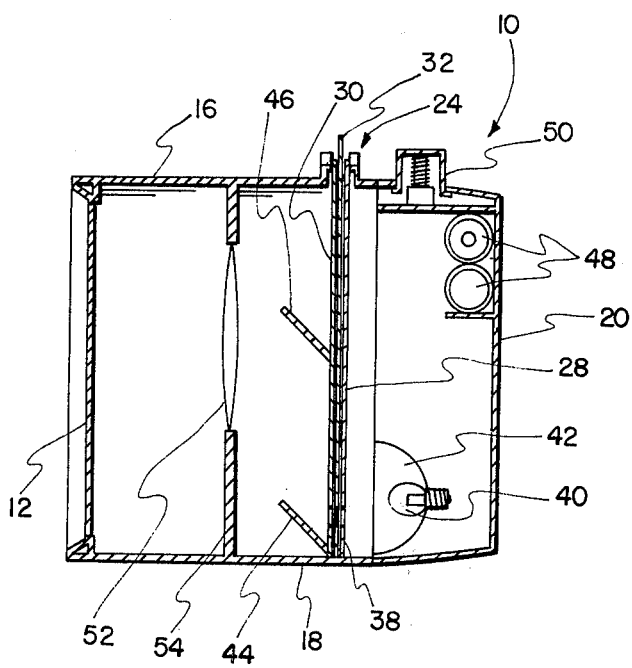
FIG. 4 is a side sectional view of the map reading apparatus taken along the lines 4—4 of FIG. 3.
Figure 5:
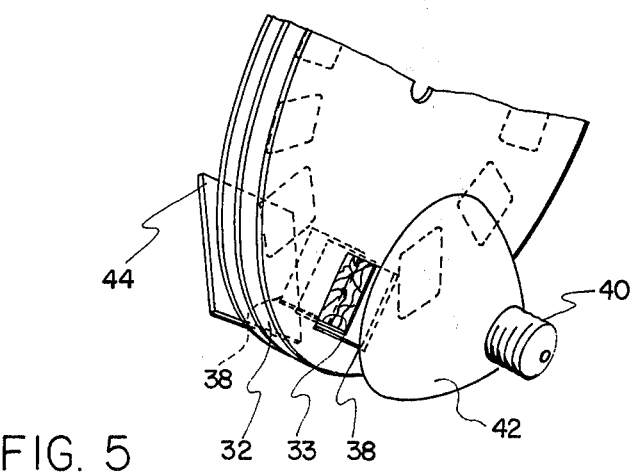
FIG. 5 is a fragmentary perspective view of a portion of the map reading and projection apparatus of the present invention particularly illustrating the area of the optical light path passing through the film material within the map reading apparatus.

As viewed in FIG. 4, just forwardly of the optical path opening means 38, there may be provided a first mirror 44 disposed generally at a 45 degree angle to the frontmost plate 30 and this mirror functions to reflect the particular map image resulting from the respective map indicia frame within the optical path opening means 38 toward the center of the front plate 30 onto a second mirror 46. The second mirror 46, as viewed in FIG. 4, may be disposed at approximately a 45 degree angle and adapted to reflect the same map image into a magnifying lens 52 disposed forwardly therefrom and appropriately spaced with respect to the mirror in accordance with the particular optical characteristics thereof in order to project and enlarge the same map image onto the forward spaced screen 12 where the same enlarged image is captured and held. The magnifying lens 52 is appropriately centrally located and held by a wall support 54. Consequently then, it is seen that by depressing switch 50, that the particular map indicia frame 33 disposed within the optical opening means 38 is projected through the magnifying lens 52 and appropriately enlarged to where the same image in an enlarged fashion is captured and held on the screen 12 where the same may be conveniently viewed by the user thereof.

The mirrors 44 and 46 may be omitted, and the magnifying lens 52 and screen 12 appropriately angled to receive and enlarge the resulting map image.

Figure 7:
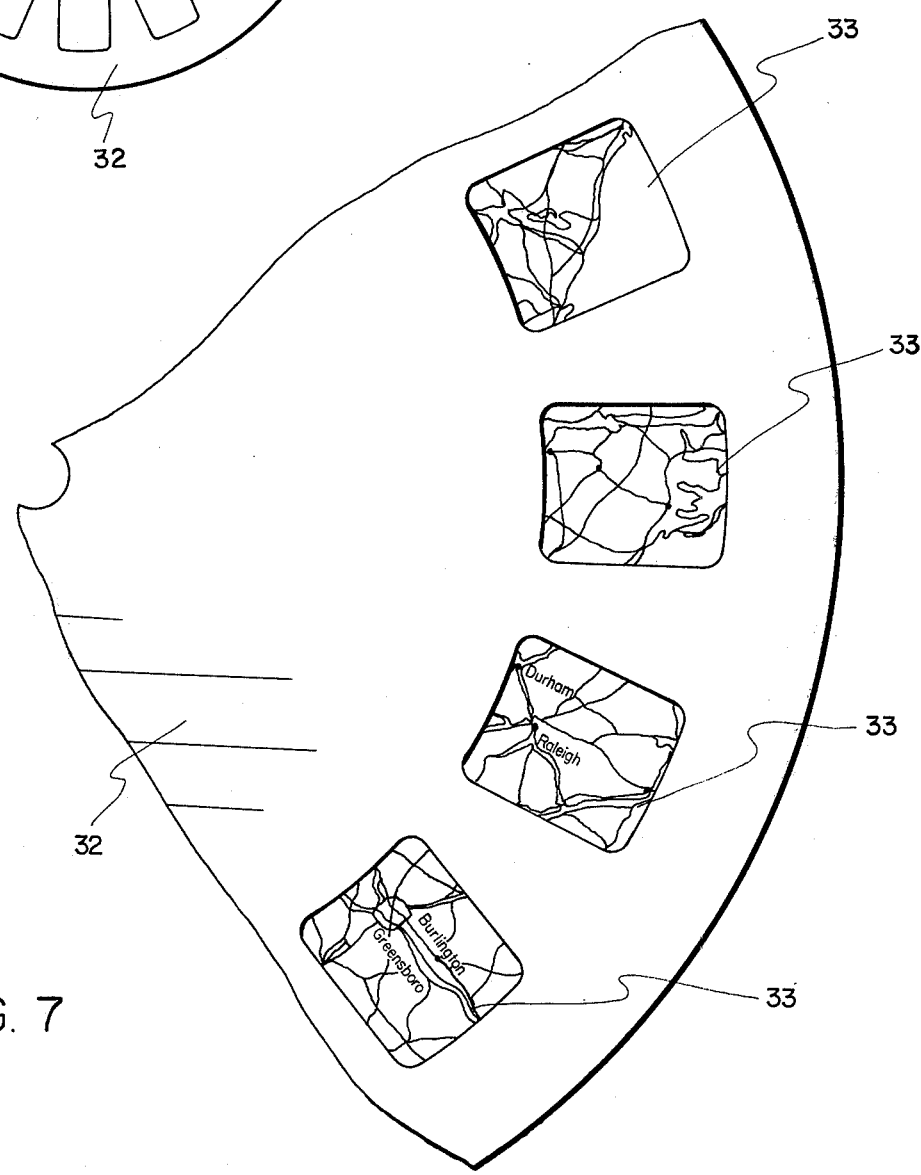
FIG. 7 is an enlarged fragmentary view of a series of micro film frames disposed about the circumferential outer area of the film disc, particularly illustrating certain geographical areas that are represented by map indicia formed thereon.

As particularly illustrated in FIG. 7, in the case of the preferred embodiment, the circular film disc is provided with a series of map indicia frames 33 that show in scale form certain geographical locations including major State and Interstate roads, Cities within the various geographical locations and even portions thereof, as may be desired or contemplated. This, as has already been pointed out, allows one to first broadly focus on a generally large geographical area, and to then focus on small areas within that same large geographical area where certain portions such as Cities and Counties and portions thereof can be shown in greater detail and to scale.

Although the present map reading apparatus has been shown in a particular rectangular housing design, it is obvious that the shape and dimensions thereof along with the manner of use can vary without the departing from the basic and essential properties and characteristics of the present invention. It is also appreciated that the map projection apparatus 10 of the present invention is particularly desirable since it is convenient to use, and generally simple in construction and would be easy to maintain. In addition, the film material, in the case of the preferred embodiment, could be provided for in a series or library of film disc with each disc representing a particular geographical area and with the particular map indicia frames 33 found therein showing certain parts or portions of the basic overall geographical area of the disc or certain map indicia frames found therein.

The terms "upper", "lower", "forward", "rearward", etc., have been used herein merely for the convenience of the foregoing specification and in thee appended Claims to describe the map reading apparatus and its parts as oriented in the drawings. It is to be understood, however, that these terms are in no way limiting to the invention since the map reading apparatus may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. An apparatus for projecting map indicia on film onto a screen where the projected map image on said screen is substantially larger than the respective map indicia on said film, said map projecting apparatus comprising;
   a. a housing structure;
   b. film holding means disposed within said housing for receiving and holding film material, said film holding means including two spaced apart plates with aligned optical path opening means formed therein for allowing light to pass therethrough;
   c. a screen formed within said housing generally forwardly of said film holding means;
   d. circular disc film means normally held in said film holding means between said two plates and including a series of radially and circumferentially spaced different and distinct road or street map indicia thereon with each respective map indicia representing a certain geographical area, and wherein said optical path opening means formed within said film holding means is formed in an area radially spaced from a center point of said disposed disc when disposed between said plates such that in rotating said film disc between said plates the respective road or street map indicia radially formed thereon align with said optical opening means;
   e. a light source disposed within said housing generally rearwardly of said film holding means relative to said screen and generally disposed behind said optical path opening means formed within said plates;
   f. reflector means generally encompassing said light source within said housing structure for directing light from said light source through said optical opening means within said plates; and
   g. combination and cooperative mirror means and magnifying lens means disposed within said housing between said film holding means and said screen for receiving said road or street map image resulting from said light source projection through said optical opening means of said film means and for enlarging the received road or street map image and projecting the same onto said screen, whereby that particular road or street map image projected on said screen may be viewed even while operating a motor vehicle, said magnifying lens means being centrally disposed generally concentrically with said film means and disposed between said forwardmost plate and said screen; and wherein said mirror means is disposed between said magnifying lens means and the forwardmost plate of said film holding means for directing the map image projection passing through said optical path opening means towards the center of said film disc and through the adjacent magnifying lens where the map image is magnified and projected onto said screen, said mirror means comprising a pair of mirrors vertically spaced along the outer side of the forwardmost plate and including a first mirror disposed adjacent the optical opening means formed within said film holding means and disposed at approximately a 45° angle relative to the forwardmost plate of said film holding means, and a second mirror aligned with said first mirror and disposed about a portion of said forwardmost plate generally in the central area of the adjacent film disc and adapted to reflect the image received from said first mirror forwardly through said adjacent disposed magnifying lens where that particular map image is magnified and projected onto said screen.

2. The map projecting apparatus of claim 1 wherein said reflector means includes a light shield generally partially spherical in shape, said light source and shield being disposed rearwardly of said rearmost plate of said film holding means and particularly placed in alignment with said optical path opening means in said film holding means such that said shield forms a housing about the rear portion of said optical path opening means within said film holding means.

3. The map projecting apparatus of claim 1 wherein said housing structure is of a generally rectangular design and includes a lower support foot extending downwardly from the bottom of said housing and adapted to rest on a vehicle dash or other surface to support said apparatus.

* * * * *